FREQUENCY STABILIZATION BY MOLECULARLY RESONANT GASES

Filed April 14, 1949

INVENTOR
WILLIAM D. HERSHBERGER
BY J. L. Whittaker
ATTORNEY

Patented Apr. 1, 1952 2,591,258

UNITED STATES PATENT OFFICE 2,591,258

FREQUENCY STABILIZATION BY MOLECULARLY RESONANT GASES

William D. Hershberger, Princeton, N. J., assignor to Radio Corporation of America, a corporation of Delaware Application April 14, 1949, Serial No. 87,496

16 Claims. (Cl. 250—36)

Figures 1, 2:
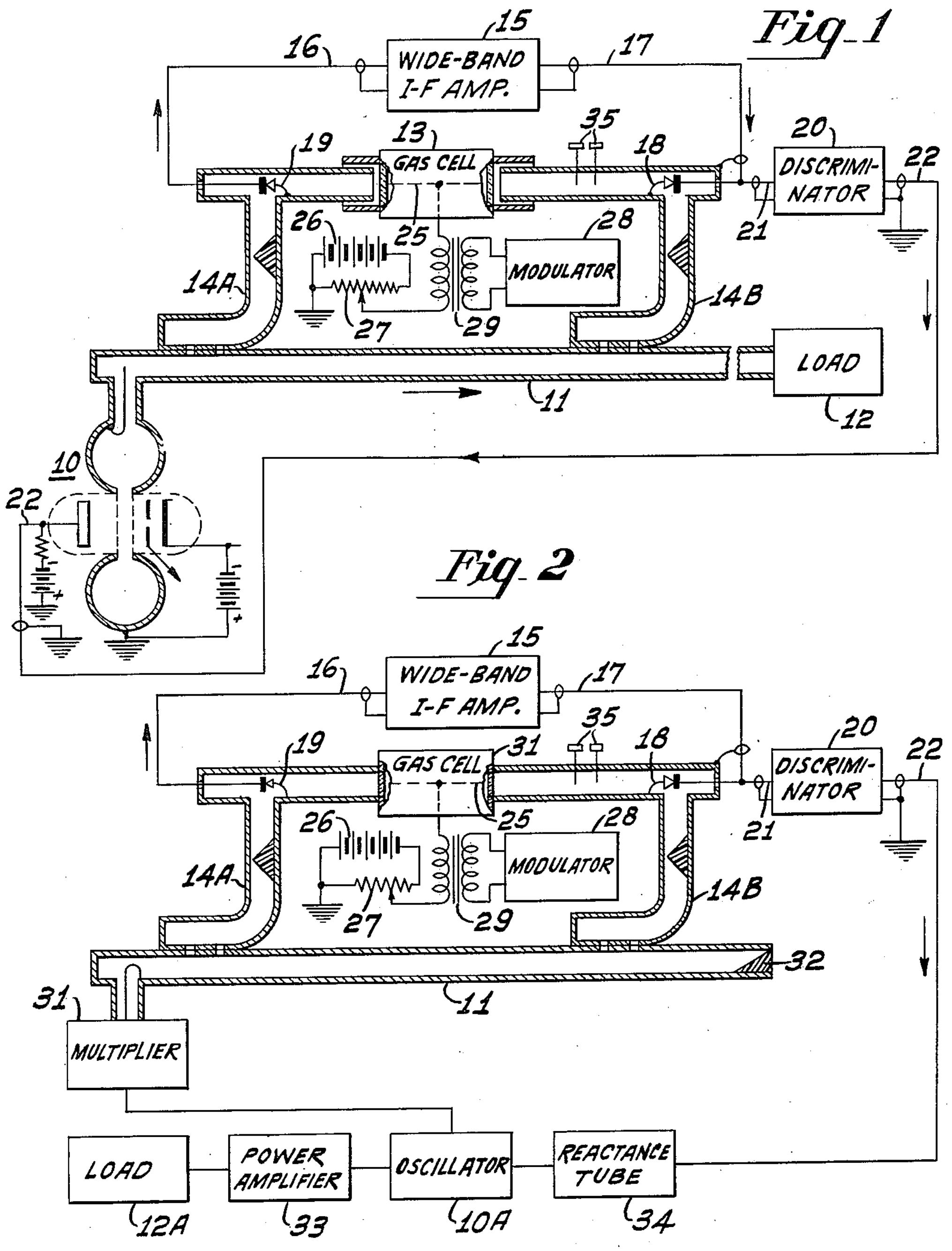

This invention relates to methods and systems for measuring and minimizing the frequency deviations of a high-frequency oscillator and particularly concerns stabilization of an oscillator at a frequency rigidly and non-harmonically related to a molecular resonant frequency of a gas.

In accordance with the present invention, as distinguished from those of earlier of my copending applications including Serial Nos. 596,242, 786,736, 5,563, 1,240, 68,648 and 73,626 utilizing a molecularly resonant gas for measurement or control of frequency, the gas cell is included in a feedback path between the input and output circuits of a wide-band intermediate frequency amplifier and the fundamental or harmonic frequency of the oscillator is impressed upon mixers respectively in the input and output circuits of the amplifier. The modulation of the high-frequency energy by the output of the amplifier, the transmission by the gas of the modulated energy and the demodulation of the transmitted energy provide for continuous generation of oscillations by the intermediate frequency amplifier, the frequency of the low-frequency oscillations depending upon the shift in phase suffered by the modulated high-frequency energy in its transmission through the gas. For measurement or minimization of the frequency deviations of the high-frequency oscillator, the amplifier oscillations are impressed upon a low-frequency discriminator whose null output frequency corresponds with the difference between a selected molecular frequency of the gas and the desired operating frequency of the oscillator, or harmonic thereof.

The invention further resides in systems and methods having the novel features of combination or operation hereinafter described and claimed.

For a more detailed understanding of the invention and for illustration of systems embodying it, reference is made to the accompanying drawings in which:

Figure 1 schematically illustrates a frequency-measuring or control system for a microwave oscillator; and Figure 2 illustrates a modification of Figure 1.

Referring to Figure 1, the oscillator 10, which may be a klystron, magnetron or other generator of microwave frequency oscillations, is coupled by transmission line 11, which may be a wave-guide, concentric line, or the like, to a load 12, generically illustrative of an antenna when the system is to be used for transmission of intelligence or a test load when the oscillator is used for calibration or other test purposes. The cell 13 containing ammonia or other gas exhibiting selective absorption at microwave frequencies is coupled to the transmission line by a pair of directional couplers 14A, 14B or equivalent coupling means known in the art.

As more fully set forth in my earlier applications above identified, there are many gases which at low pressures exhibit sharp molecular resonance at one or more microwave frequencies characteristic of the selected gas and independent of ambient conditions, such as temperature.

In accordance with the present invention, the gas cell 13 is included in a feedback loop between the input and output circuits of amplifier 15 suited to pass a wide band of frequencies of much lower order than microwave frequencies; for example, the mean pass frequency of amplifier 15 may be say 10 megacycles, 50 megacycles, or 100 megacycles, at which frequencies high gain or amplification may readily be obtained with conventional circuits.

High-frequency energy from the oscillator 10 is impressed upon a mixer 18, such as a crystal rectifier or diode, upon which is also impressed, by lead 17, the output of the amplifier 15. One of the resulting side-bands is selected, as by a microwave filter 35 of suitable type, for impression upon the gas cell. The selected side-band or modulated microwave energy is transmitted through the gas cell and assuming the side-band frequency is above or below the selected molecular resonant frequency of the gas, it is subjected to a shift in phase due to the sharp reactance characteristic of the gas. The modulated carrier energy transmitted by the gas is impressed upon a second mixer 19, which may also be a crystal rectifier or diode, upon which is impressed unmodulated microwave energy passed by the directional coupler 14A. By the mixer or demodulator action, there is produced an input signal, corresponding with the modulation frequency of the carrier, which is transmitted by the lead 16 to the input of the amplifier 15.

In effect therefore, the gas cell 13 and the mixers, when excited by the high-frequency oscillator energy, serve to complete a feedback loop for the wide-band amplifier 15 which consequently generates oscillations of low or intermediate frequency. Moreover, the frequency of these low-frequency oscillations is directly related to the phase shift produced by the gas upon the modulated microwave energy. The relation between the oscillator frequency ($F_o$), the molecular resonant frequency of the gas ($F_g$) and the low-frequency oscillations generated by amplifier 15 ($F_a$) may be expressed by the formula:

$$(1) \qquad F_o = F_g \pm F_a$$

As the molecular resonant frequency of the gas is constant, the frequency of the microwave oscillations produced by oscillator 10 is simply related to the low-frequency oscillations produced by amplifier 15; hence the problem of accurately measuring the frequency, or deviations in frequency, of the microwave oscillator is greatly simplified. By way of example, a drift in frequency of say 10 megacycles at the frequency of oscillator 10 may be small, say the order of only 1 part in about 2500, whereas the corresponding change in frequency of the oscillations produced by the low-frequency amplifier would be high, say 1 part in 10 or less.

The frequency or change in frequency of the low-frequency oscillations may be measured in any manner using conventional low-frequency techniques. Preferably however, and particularly for stabilization of the frequency of oscillator 10, there is coupled to the low-frequency feedback loop a discriminator 20 having null output at a frequency corresponding with the difference between the desired operating frequency of oscillator 10 and the selected molecular resonant frequency of the gas in cell 13. The discriminator may be of any suitable type, for example, of the type disclosed in my aforesaid copending application Serial No. 68,648. In the particular arrangement shown, the output circuit of the wide-band amplifier 15 is coupled to the input circuit of the discriminator, the input lead 21 of the discriminator supplying it with the low-frequency produced by amplifier 15. The unidirectional voltage output of the discriminator therefore varies in sense and to extent corresponding with deviations of the frequency of the microwave oscillator 10 from its desired operating frequency and may be used in any of the ways disclosed in my aforesaid copending applications to control the frequency of microwave oscillator 10. Specifically and as schematically illustrated in Figure 1, the output voltage of the discriminator may be applied by output lead 22 to vary the potential of the reflex anode of klystron 10.

The selection of different operating frequencies of oscillator 10 may be effected by substitution for gas cell 13 of another cell containing gas having a different molecular resonant frequency; or more conveniently, particularly for a restricted range of operating frequencies, the cell 13 may be provided with a Stark electrode 25. By applying different direct-current potentials to the Stark electrode, a molecular resonant line of the gas may be split or displaced from the original line, so affording a different reference frequency $F_g$ for each different applied potential. In the particular arrangement shown in Figure 1, the biasing voltage for the Stark electrode 25 is supplied by battery 26, generically representative of any direct-current source, and the selection of different voltages is effected by a potentiometer 27, generically representative of any suitable means for varying the direct-current potential applied to the Stark electrode 25. For a fuller discussion of the Stark effect, reference is made to my copending application Serial No. 5,563.

Further, the selection of different operating frequencies of oscillator 10 may be effected by suitable adjustment of the tuning of discriminator 20 which adjustment has the effect of determining that particular frequency for which the discriminator output changes sign.

An oscillator 10 stabilized as above described may be frequency-modulated as by audio or video signals. Preferably and as shown in Figure 1, the modulation frequency is applied to vary the potential of the Stark electrode 25 so to change the reactive effects of the gas upon the microwave side-band output of the mixer 18. This changes the frequency of the low-frequency oscillations produced by the amplifier at the output-frequency of the modulator 28 which is coupled as by transformer 29 to the Stark electrode. In turn, this changes the unidirectional output of the discriminator 20 at the modulating frequencies. For reasons more fully discussed in my copending application Serial No. 68,648, the set point frequency of the stabilizing system is varied at the modulating frequency with the result the mean carrier frequency of the microwave oscillator is rigidly stabilized despite the frequency-modulation.

When the system is so used, the range of modulation frequencies should correspond with a band not greater than the wide-band of amplifier 15; for example, for video modulation requiring a band width of about 5 megacycles, the amplifier 15 may be suited to pass frequencies within a range of from about 40 to about 60 megacycles.

The invention may to advantage be used with oscillator operating in the sub-microwave portion of the frequency spectrum. In such case, as in Figure 2, a frequency multiplier or harmonic amplifier 31 of suitable number of stages is interposed between the oscillator 10A and the transmission line 11. As the amount of power required for operation of the stabilization system is small, the present lack of efficient high-power frequency multipliers in the microwave region is relatively unimportant. In this modification, the relation between the operating frequency ($F_o$) of the oscillator, the frequency ($F_a$) of the low-frequency oscillations produced by the wide-band amplifier 15, and the frequency ($F_g$) of molecular resonance of the gas cell is expressed by the equation:

$$(2) \qquad F_o = \frac{F_g \pm F_a}{n}$$

where $n$=the order of the harmonic. It will be seen that this equation is the same as that of Equation 1 when the oscillator frequency is directly impressed upon the transmission line 11, in which special case the harmonic number ($n$) is unity.

To avoid reflection of microwave power in the transmission line 11, it is terminated in a resistive load 32 such as an absorption wedge, or the like.

For control of the frequency of oscillator 10A by the output of the discriminator 20, there may be used any of the low-frequency techniques familiar to those skilled in the art; for example, the unidirectional output voltage of the discriminator may be applied to the grid of a reactance tube 34 to vary the effective inductance of a tuned circuit of the oscillator. Such arrangements are per se known and need not be further described.

In most cases, the oscillator 10A will be used to excite a power amplifier 33 of conventional type, which at higher energy level supplies high-frequency power to the antenna or other load represented by the block 12A. In this modification, as in that of Figure 1, the gas cell 13 may include a Stark electrode either for the purpose of shifting the set-point frequency of the oscillator 10A, and/or for effecting frequency-modulation of the oscillator, while at the same time stabilizing its mean carrier frequency under rigid control of a selected absorption line frequency of the gas in cell 13.

It shall be understood the invention is not limited to the particular arrangements described and that changes and modifications may be made within the scope of the appended claims.

I claim as my invention:

1. A system for stabilizing the frequency of a radio frequency generator at a desired operating frequency comprising a cell containing gas exhibiting molecular resonance at a different frequency from said operating frequency, an intermediate frequency amplifier, means coupling said generator to said gas cell, means coupling said intermediate frequency amplifier to said gas cell to provide sustained oscillations in said amplifier at an intermediate frequency equal to the algebraic sum between the resonant frequency of said gas cell and the frequency of said generator, a discriminator tuned substantially to said intermediate frequency and responsive to said sustained oscillations for deriving control signals characteristic of the frequency of said oscillations, and means responsive to said control signals for varying the frequency of said generator to maintain substantially constant said oscillator operating frequency.

2. A system for stabilizing the frequency of a radio frequency generator at a desired operating frequency comprising a cell containing gas exhibiting molecular resonance at a different frequency from said operating frequency, a wide band intermediate frequency amplifier, means coupling said generator to said gas cell, means coupling said intermediate frequency amplifier to said gas cell to provide sustained oscillations in said amplifier at an intermediate frequency equal to the algebraic sum between the resonant frequency of said gas cell and a predetermined multiple of the frequency of said generator, a discriminator tuned substantially to said intermediate frequency and responsive to said sustained oscillations for deriving a control potential characteristic of the frequency of said oscillations, and means responsive to said control potential for varying the frequency of said generator to maintain substantially constant the frequency of said intermediate frequency oscillations with respect to the resonant frequency of said gas cell.

3. A system for producing a voltage varying in accordance with deviations from a predetermined operating frequency of a high-frequency oscillator comprising a cell containing gas exhibiting molecular resonance, an intermediate frequency amplifier, a feedback loop for said amplifier including said gas cell and mixers respectively disposed on input and output sides of said cell, means for coupling the oscillator to said mixers to effect oscillation of said amplifier at an intermediate frequency, and a discriminator coupled to said feedback loop and having null output-voltage at a frequency corresponding with the difference between the molecular resonant frequency of said gas and said predetermined operating frequency of said oscillator.

4. A system for producing a voltage varying in accordance with deviations from a predetermined operating frequency of a microwave oscillator comprising a cell containing gas exhibiting molecular resonance at a microwave frequency different from the oscillator frequency, an intermediate frequency amplifier, a feedback loop for said amplifier including said gas cell and mixers respectively disposed on input and output sides of said cell, means for coupling the oscillator to said mixers to effect oscillation of said amplifier, and a discriminator coupled to said feedback loop and having null output-voltage at a frequency corresponding with the difference between the molecular resonant frequency of said gas and said predetermined operating frequency of said microwave oscillator.

5. A system for producing a voltage varying in accordance with deviations from a desired operating frequency of a high-frequency oscillator comprising an intermediate-frequency amplifier, a mixer in the output circuit of said amplifier and coupled to said high-frequency oscillator to produce a side-band frequency, a gas cell exhibiting molecular resonance at said side-band frequency and shifting the phase thereof in dependence upon the difference between the side-band frequency and the molecular resonance frequency, a second mixer in the input circuit of said amplifier coupled to said oscillator to demodulate said side-band frequency for continuous generation of oscillations by said amplifier at an intermediate frequency varying with the phase-shift produced by said gas, and a discriminator coupled to said first mixer and having null output-voltage at a frequency corresponding with the difference between the molecular resonant frequency of said gas and said predetermined operating frequency of the oscillator.

6. A system for producing a voltage varying in accordance with deviations from a predetermined operating frequency of a microwave oscillator comprising an intermediate frequency amplifier, a mixer in the output circuit of said amplifier and coupled to said oscillator to produce a side-band frequency, a cell containing a molecularly resonant gas upon which the output of said mixer is impressed and exhibiting molecular reactance upon deviation of said side-band frequency from the molecular resonance frequency of the gas, a second mixer in the input circuit of said amplifier and coupled to said oscillator and said gas cell for continuous generation of oscillations by said amplifier at an intermediate frequency varying with microwave side-band frequency, and a discriminator coupled to said first mixer and having null output-voltage at a frequency proportional to the difference between the molecular resonance frequency of said gas and said predetermined operating frequency of said oscillator.

7. A system for producing a low frequency varying in accordance with frequency deviations of a microwave oscillator comprising a cell containing gas exhibiting molecular resonance at a standard frequency different from said oscillator frequency, a high-gain low-frequency amplifier for passing a wide band of frequencies much lower than said standard frequency and the oscillator frequency ($F_o$), mixers respectively disposed in the input and output circuits of said amplifier and on input and output sides of said cell, and means for coupling said microwave oscillator to said mixers for generation of oscillations by the amplifier at a low frequency ($F_a$) dependent upon the reactive effect of said gas upon the side-band frequency ($F_o+F_a$ or $F_o-F_a$)

produced by the mixer on the input side of said gas cell and in the output circuit of said amplifier.

8. A system for producing a voltage varying in accordance with deviations from a predetermined operating frequency of a microwave oscillator comprising a cell containing gas exhibiting molecular resonance at a microwave frequency different from said operating frequency, a wide-band, low-frequency amplifier, mixers respectively disposed in the input and output circuits of said low-frequency amplifier and on input and output sides of said gas cell, means for coupling said microwave oscillator to said mixers for completion of a feedback loop of said amplifier resulting in generation of low-frequency oscillations thereby, and a discriminator coupled to said feedback loop and having null output-voltage at a frequency proportional to the difference between the molecular resonant frequency of said gas and said predetermined operating frequency of said oscillator.

9. A system for stabilizing the frequency of a microwave oscillator at a desired operating frequency comprising a cell containing gas exhibiting molecular resonance at a different microwave frequency, a low-frequency discriminator, the algebraic sum of whose null-output frequency and the molecular resonant frequency of said gas corresponds with said desired operating frequency, a wide-band, low-frequency amplifier, mixers respectively disposed in the input and output circuits of said amplifier, means for coupling said microwave oscillator to said mixers to effect oscillation of said amplifier at a low-frequency in said wide band of frequencies, means for impressing said amplifier oscillations upon said discriminator to produce a unidirectional control voltage varying in accordance with deviations of the amplifier oscillations from said null-output frequency, and means for applying said unidirectional control voltage to minimize deviations of the oscillator frequency from said desired operating frequency.

10. A system for stabilizing the frequency of a microwave oscillator at a desired operating frequency comprising a wide-band intermediate frequency amplifier, a mixer in the output circuit of said amplifier and coupled to said oscillator to produce a side band whose frequency corresponds with the algebraic sum of said oscillator frequency and an intermediate frequency in said wide band of frequencies, a gas cell exhibiting molecular resonance for passing the side band with a shift in phase dependent upon the difference with its frequency and the molecular resonance frequency of the gas, a second mixer in the input circuit of said amplifier and coupled to said oscillator and said gas cell for demodulation of said side-band frequency with consequent generation by said amplifier of oscillations whose frequency varies with said phase shift, a discriminator upon which said amplifier oscillations are impressed and having null output-voltage at a frequency corresponding with the difference between the molecular resonant frequency of said gas and the desired operating frequency of said microwave generator, and means for applying the output of said discriminator to vary the operating frequency of said microwave oscillator.

11. A system for stabilizing the frequency of a high-frequency oscillator at a desired operating frequency comprising an intermediate frequency amplifier, a cell containing gas molecularly resonant at a frequency $F_g=nF_o\pm F_{if}$ (where $F_g$=standard frequency, $n$=whole number, $F_{if}$=intermediate amplifier frequency, and $F_o$=desired operating frequency of the high-frequency oscillator), a feedback loop including said amplifier, said gas cell and mixers respectively in the input and output circuit of said amplifier, means for impressing the fundamental or harmonic frequency of said oscillator upon said mixers, a discriminator coupled to said loop to produce a unidirectional output voltage varying in sense and extent in accordance with changes in frequency of the output of said intermediate frequency amplifier, and means for applying said voltage to said high-frequency oscillator to regulate its frequency.

12. A system for frequency-modulating and stabilizing the mean carrier frequency of a high-frequency oscillator comprising a cell containing gas exhibiting molecular resonance, a Stark electrode in said cell, a discriminator, the algebraic sum of whose null output-frequency and a molecular resonant frequency of said gas is proportional to the desired mean carrier frequency, a wide-band intermediate frequency amplifier, mixers respectively disposed in the input and output circuits of said amplifier in a feedback loop including said gas cell, means for coupling said oscillator to said mixers to effect oscillation of said amplifier, means for varying the potential of said Stark electrode at modulation frequency correspondingly to vary the frequency of the amplifier oscillations, means for impressing the amplifier oscillations upon said discriminator to produce a unidirectional output voltage varying at said modulation frequency and whose average value varies in accordance with deviations of the mean carrier frequency of said oscillator, and means for applying said voltage to stabilize the mean carrier frequency of the oscillator and to vary its instantaneous carrier frequency in accordance with the modulation.

13. A system for generating low-frequency oscillations of frequency rigidly related to the frequency of microwave oscillations comprising a low-frequency amplifier having a wide band-pass characteristic, mixers in the input and output circuits of said amplifier, a gas cell in a microwave transmission path between said mixers and containing gas exhibiting selective absorption at microwave frequencies, and means for applying said wicrowave oscillations to said mixers to provide a feedback loop for generation of oscillations by said amplifier at a sub-microwave frequency within said band, the sum of the frequencies of said sub-microwave oscillations and said microwave oscillations being numerically equal to the molecular resonant frequency of said gas.

14. A system for stabilizing the frequency of a high-frequency oscillator which comprises a low frequency amplifier, means for mixing the outputs of said oscillator and said low frequency amplifier to produce a side-band, means for transmitting said side-band through a molecularly resonant gas to produce a phase shift dependent upon its frequency and the molecular resonant frequency of the gas, means for mixing the oscillator frequency and the transmitted side-band to produce a low frequency signal, means for applying said signal to said amplifier for sustained generation of oscillations at low frequency dependent upon the operating frequency of said oscillator, means for producing a control voltage varying in sense and magnitude with variation of the frequency of said low-frequency oscillations, and means for applying said control voltage to vary the operating frequency of said oscillator.

15. A system for stabilizing the frequency of a high-frequency oscillator which comprises means for utilizing the output of said oscillator as a carrier modulated by a low frequency to produce a side-band frequency, means for transmitting the side-band frequency through a molecularly resonant gas to produce a phase-shift dependent upon the oscillator frequency, means for demodulating the transmitted side band for sustained generation of oscillations at said low frequency, means for producing a control voltage varying in sense and extent dependent upon deviations of said low frequency from a predetermined value, and means for applying said control voltage to minimize deviations of the oscillator frequency from said desired value thereof.

16. A system for stabilizing and frequency-modulating a high-frequency oscillator which comprises means for modulating microwave energy of frequency corresponding with the fundamental or higher harmonic frequency of said oscillator at sub-microwave frequency to produce a microwave side-band frequency, means for impressing the side-band energy upon a molecularly resonant gas to produce a phase-shift, means for varying the molecular resonance frequency of said gas at desired modulation frequencies of said high-frequency oscillator, means for demodulating the transmitted side-band for sustained generation of oscillations at said sub-microwave frequency with superimposed modulation at said desired modulation frequencies, means for producing a unidirectional voltage whose average value varies in accordance with the average value of said sub-microwave frequency and whose instantaneous value varies at said superimposed modulation frequencies, and means for applying said voltage for control of the frequency of said high-frequency oscillator.

WILLIAM D. HERSHBERGER

No references cited.